US012780244B2

(12) United States Patent
Chang et al.

(10) Patent No.: US 12,780,244 B2
(45) Date of Patent: Nov. 3, 2026

(54) SELF-SUPERVISED LEARNED MODEL FOR CONTROLLING A VEHICLE

(71) Applicant: Zoox, Inc., Foster City, CA (US)

(72) Inventors: Yan Chang, Sunnyvale, CA (US); Alec Jacob Farid, Commack, NY (US); Aaron Huang, San Francisco, CA (US); Samir Joshi, Los Altos, CA (US); Sutej Pramod Kulgod, Foster City, CA (US); Gary Linscott, Seattle, WA (US); Ethan Miller Pronovost, Redwood City, CA (US); Peter Scott Schleede, El Dorado Hills, CA (US)

(73) Assignee: Zoox, Inc., Foster City, CA (US)

( * ) Notice: Subject to any disclaimer, the term of this patent is extended or adjusted under 35 U.S.C. 154(b) by 146 days.

(21) Appl. No.: 18/489,569

(22) Filed: Oct. 18, 2023

(65) Prior Publication Data

US 2025/0128731 A1 Apr. 24, 2025

(51) Int. Cl.
*B60W 60/00* (2020.01)

(52) U.S. Cl.
CPC ....... *B60W 60/001* (2020.02); *B60W 2552/30* (2020.02); *B60W 2554/4029* (2020.02)

(58) Field of Classification Search
None
See application file for complete search history.

(56) References Cited

U.S. PATENT DOCUMENTS

2021/0406589 A1* 12/2021 Yadav ....................... G06T 7/11
2022/0156525 A1 5/2022 Guizilini et al.
2023/0085296 A1 3/2023 Liu et al.
2023/0145236 A1 5/2023 Bagnell et al.
2023/0242157 A1 8/2023 Donderici
2024/0336272 A1 10/2024 Patwari et al.
(Continued)

FOREIGN PATENT DOCUMENTS

CN 114495050 A 5/2022
CN 115860102 A 3/2023
EP 3839830 A1 6/2021

OTHER PUBLICATIONS

International Search Report and Written Opinion dated Jan. 24, 2025 for PCT International Application No. PCT/US2024/051664.
(Continued)

*Primary Examiner* — Donald J Wallace
*Assistant Examiner* — Paysun Wu
(74) *Attorney, Agent, or Firm* — EIP US LLP

(57) ABSTRACT

There is provided a system configured to receive data associated with a vehicle operating within an environment; generate, based at least in part on the data, a graph comprising a plurality of nodes, a node of the plurality associated with one or more of a vehicle operating in the environment, a road feature, an additional vehicle, or a pedestrian; input the graph into a self-supervised machine learned model comprising an encoder, wherein the machine learned model is trained to output a representation associated with the node; receive, from the self-supervised machine learned model, a representation associated with the node; and transmit the representation to a downstream machine learned model trained to output control data based at least in part on the representation, wherein the control data is configured to control the vehicle or another vehicle.

19 Claims, 9 Drawing Sheets

(56) References Cited

U.S. PATENT DOCUMENTS

| | | | | |
|---|---|---|---|---|
| 2024/0353231 | A1* | 10/2024 | Burlina | G01C 21/32 |
| 2024/0412499 | A1 | 12/2024 | Ekman Von Huth et al. | |
| 2025/0022286 | A1 | 1/2025 | Subramanian et al. | |
| 2025/0078532 | A1* | 3/2025 | Zhao | G06V 20/588 |
| 2025/0115253 | A1* | 4/2025 | Pourkeshavarz | B60W 60/001 |

OTHER PUBLICATIONS

United States Non-Final Office Action dated May 30, 2025 for U.S. Appl. No. 18/489,620.

United States Notice of Allowance dated Jan. 23, 2026 for U.S. Appl. No. 18/489,620.

* cited by examiner

SELF-SUPERVISED LEARNED MODEL FOR CONTROLLING A VEHICLE

BACKGROUND

Autonomous and semi-autonomous vehicles may have various computing systems, including several machine-learning based models, for deriving information from input data and then controlling the vehicles based on that information. The input data may be captured by sensor systems of the autonomous or semi-autonomous vehicles and transmitted to downstream systems for further processing. Some such systems may require large amounts of labeled data for training, which can be resource intensive and difficult to update based on changes to models.

In use, computing systems of an autonomous vehicle may be near continuously processing large amounts of captured data to determine how to navigate the vehicle through an environment. This processing may require a significant amount of computing resources.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
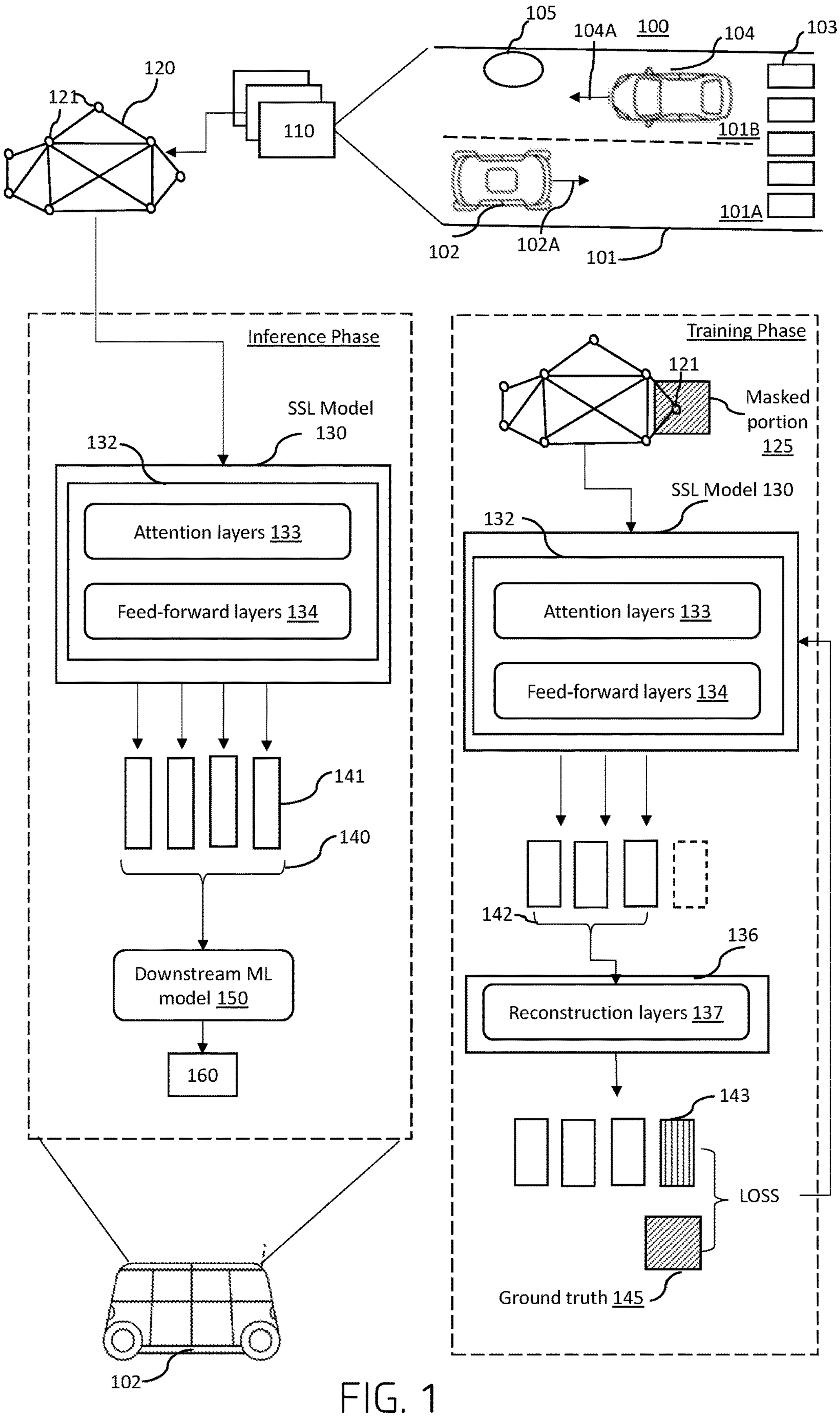
FIG. 1 is a schematic diagram of an exemplary system that uses a self-supervised machine learned model.

This application relates to procedures, methods, systems, and computer-readable media that provide a machine learned model trained to generate a representation of an environment in which an autonomous vehicle is operating. The representation may be used by various other machine learned models associated with the vehicle that rely on data defining the environment to complete respective processes in order to navigate the vehicle through the environment or control an aspect of the behavior of the vehicle therein.

This application also relates to procedures, methods, systems, and computer-readable media that provide a system for adapting a machine learned model for a particular task related to operating an autonomous vehicle in an environment and subsequently deploying that model for execution by online (on-vehicle) or offline (off-vehicle) computing systems associated with the autonomous vehicle.

Computer systems onboard or associated with an autonomous or semi-autonomous vehicle may comprise multiple systems that process sensor data captured by a sensor system associated with the vehicle. These multiple systems may all require an understanding of the environment surrounding the vehicle and a scene within that environment in order to provide an optimal output that may be the basis for controlling the vehicle. A scene may comprise multiple objects in the vicinity of the vehicle, where some of the objects may be dynamic (for example, another vehicle, a pedestrian, a stop light) and some of the objects may be static (for example, a pedestrian crosswalk, a road lane, a road junction). Since a scene within an environment will likely change over a series of time steps due to presence of dynamic objects and the dynamic nature of the vehicle itself, the aforementioned computer systems may be near-continuously processing large amounts of sensor data in order to have an understanding of the environment surrounding the vehicle, such as a present scene associated with a current time step and, possibly, a likely future scene associated with a future time step. The nature of this near-continuous processing may require large amounts of computing resources.

The inventors have developed the various techniques described herein that enable a backbone or otherwise referred to as a core machine learned model to output a representation of the environment of an autonomous vehicle. This representation may, for example, be embodied as an encoding in meaningful latent space (e.g., an arbitrary-length tensor or vector) that represents the machine learned model's understanding of the environment and the relevance of features therein to one another. The representation may be transferrable to multiple online or offline computer systems or machine learned models associated with the vehicle in place of separate respective processes to train models and then interpret and process sensor data to obtain an understanding of the environment. In this way, there is reduced redundancy of work and reduced overhead both on and off vehicle because the computing resources that would have been assigned to the separate processes used to generate different representations of the environment or scene therein may be more efficiently managed or assigned to other processes. This in turn may improve performance of the computing systems, individually or as a whole. As also described herein, the backbone machine learned model may be trained in a self-supervised manner to operate on a driving scene constructed as a graph containing nodes and edges and may output a representation (for example, in the form of an embedding) for a node associated with a particular object or feature within the environment. In this disclosure, since the graph containing multiple nodes may represent the environment, the output, which is generated based at least in part on the graph, may alternatively be referred to as a node-level embedding or a node embedding.

The embedding may be transmitted to another machine learned model for further processing relating to a specific task assigned to the other machine learned model. Throughout the disclosure, though other machine learned models are discussed, it should be understood that such additional models may be additional heads of a single model, non-machine learned models, or any combination thereof. Providing node-level embeddings rather than scene-level embeddings enables downstream models to have flexibility in how the node embeddings are used. In addition, node-level embeddings are less complex and require less dimensionality than scene embeddings and more closely correspond to human understanding of a driving scene, where different features of the scene have different levels of importance depending on context. Moreover, the node embeddings may be generated by a backbone machine learned model that may have been trained using a large amount of data, which may not be possible for the downstream models due to compute constraints, particularly if the downstream models may run on-vehicle.

The backbone machine learned model may be pretrained, possibly deployed to various computer systems associated with the vehicle, and then adapted for a specific task relating to a downstream machine learned model such that the backbone model may be considered a backbone for achieving specific tasks, thereby reducing redundant computation and improving latency. Adapting a pretrained model for a specific task may improve the performance of a downstream task-specific model because it receives more useful input from the adapted pretrained model. This may result in a better performance of the autonomous vehicle as it navigates within the environment, for example, increasing its driving performance, such as how accurately the vehicle follows a route, a decrease in rate of acceleration or deceleration, and how the vehicle navigates around obstructions within the environment. In addition, applying the pretrained backbone model to a specific task with a small number of updates leverages the training previously performed, so reduces the amount of computing resources required to perform the specific task and means that task specific performance can be trained without an extensive dataset.

The backbone machine learned model may be a transformer-based model which enables predictable scaling using simple architecture, allowing for a tradeoff between latency, memory usage, and performance.

The techniques described herein can be implemented in a number of ways. Example implementations are provided below with reference to the accompanying figures, FIGS. 1-9. Although discussed in the context of an autonomous vehicle, the methods, apparatuses, and systems described herein can be applied to a variety of systems and are not limited to autonomous vehicles. In another example, the techniques can be utilized in an aviation or nautical context. Additionally, the techniques described herein can be used with physical data (e.g., captured using sensor(s)), simulated data (e.g., generated by a simulator), or any combination of the two.

Training and Use of Self-Supervised Learned Model

FIG. 1 is a schematic diagram of an exemplary system that uses a self-supervised machine learned model. In FIG. 1, a driving environment 100 is shown. In this example, environment 100 is a real-world environment, but in other examples may be based on a simulated environment. A first vehicle 102, which in this example is an autonomous vehicle, is depicted as travelling in a first lane 101A of a road 101 in a forward direction in the direction of the arrow 102A. A second vehicle 104, which in this example may be a human-operated car, may also be travelling on the road 101 in a second lane 101B in a forward direction, in the direction of the arrow 104A. In this example, a pedestrian crosswalk 103 crosses both lanes 101A and 101B of the road 101. An object 105 is located in the second lane 101B of the road 101.

In order to navigate the road 101 successfully, the first vehicle 102 may include one or more vehicle systems and may be in communication with one or more remote computer systems. The vehicle systems may be a subset of the systems incorporated in the vehicle. Further vehicle systems and remote computer systems are described in relation to FIG. 9 below.

Data 110 associated with the first vehicle 102 operating within the driving environment 100 may be captured by a sensor system of the vehicle systems on the vehicle 102, a sensor system remote from the vehicle 102 (for instance, located along the road 101 or associated with another vehicle (not shown) in the environment 100), or a combination of both. In some examples, the data 110 is an output of a perception component of the first vehicle 102. In other words, the data 110 data may represent processed data, rather than raw sensor data. In examples, the data 110 may be stored as log data on the vehicle 102 or off-vehicle. The data 110 may have various data formats.

Alternatively, the data 110 may comprise data gathered by a simulated vehicle travelling through a simulated environment, or derived therefrom. The simulation may simulate a real-world environment and the simulated vehicle may be a simulated representation of a real-world vehicle. For example, the simulated vehicle may comprise simulated localization, perception, planning, and/or prediction components. These components may operate as if they were in a real-world environment, generating data representing the simulated environment in the same form as data gathered by a real vehicle traversing a real environment. Thus, simulated log data may substantially resemble real-world log data.

The data 110 may be received by a computer system associated with the vehicle 102. A computer system associated with the vehicle 102 may be a vehicle system on the vehicle 102 or a remote computer system. The following process is described in relation to a computer system associated with the vehicle 102, for instance, one or more steps of the following process may be performed by a computer system associated with the vehicle 102.

A graphical representation (graph) 120 of the environment may be generated based at least in part on the data 110. The graph 120 may comprise a plurality of nodes 121. Each node of the plurality 121 may be associated with one or more of a vehicle operating in the environment (for example, first vehicle 102), a road feature (for example, crosswalk 103, lane, lane width, traffic control signal, etc.), an additional vehicle (for example, second vehicle 104), an object or pedestrian (for example, object 105), or any other portion of the environment relevant for driving. Further detail relating to the graph 120 and its generation is described in relation to FIG. 2.

The data 110 may relate to other vehicles, pedestrians, or objects, such as street furniture (for example, streetlamps, street signs, traffic lights, mailboxes, railings, potholes, sidewalks, crosswalks, curbs), street markings, and static vehicles, present in the vicinity of the first vehicle 102 and interactions therebetween. For example, the data 110 may comprise information relating to different attributes of the different features in the environment, such as position, trajectory, yaw, speed, acceleration, classifications, and/or dimensions of one or more features in the environment 100, such as the first and second vehicles 102 and 104, and the object 105. In addition, the data 110 may comprise information relating to other attributes such as physical location, width, number of lanes, curvature, gradient etc. of the road 101, the individual lanes of the road 101A and 101B, and the crosswalk 103. The data 110 may be stored as part of a driving log in a driving log database associated with the first vehicle 120. The database may be stored in memory (not shown) of the vehicle 102. The driving log database may comprise a plurality of driving logs generated by the vehicle 102.

The data 110 may comprise multiple instances of data, each instance may relate to an individual scene representing the environment 100 at a single point in time. Alternatively, each instance of data may relate to a sequence of scenes, representing the environment 100 over a period of time.

In the example of FIG. 1, one or more sets of log data (for example, each set being associated with a series of time steps) may be provided to a remote computing device(s) for the potential purpose of training the SSL model 130 in a training phase, described in the "Training Phase" section below.

Inference Phase

During an inference phase, the graph 120 may be input to a self-supervised machine learned model 130, also referred to as SSL model 130. In the example of FIG. 1, the SSL model 130 may be executed on-vehicle.

The SSL model 130 may be a neural network, for example, a neural network configured to comprise a transformer architecture, trained to learn embeddings related to particular features of an environment. The transformer architecture of the SSL model 130 may comprise an encoder 132. The encoder 132 may comprise a plurality of attention layers 133 (also referred to as a self-attention mechanism) and a plurality of feed-forward layers 134. The SSL model 130 may comprise further transformer layers (not shown), where each transformer layer comprises a further encoder 132 (also referred to as an encoder layer), such that the SSL model 130 may be scaled to a desired size by adding additional transformer layers and may comprise a transformer stack. In examples, the SSL model 130 may comprise an encoder-only model, such as a BERT-style transformer that attends over both the past and the future as well as all the nodes at the same time.

The attention layers 133 of the SSL model 130 may receive the graph 120 as input. The attention layers 133 may be trained to weight the importance of the different nodes in the graph and determine the relationship between and relevance thereof of a feature of the environment associated with a given node. For example, the first vehicle 102 (associated with the node 121*a*, see FIG. 2), and other features within the environment represented by the other nodes of the graph 120. The attention layers 133 may then generate an output representative of the determined relation and relevance for each input node.

The outputs generated by the attention layers may be input to the feed-forward layers 134 that may be configured to further process the individual outputs to generate a plurality of embeddings 140. The plurality of embeddings 140 may comprise a first embedding 141, where the first embedding 141 is associated with a node of the graph 120. The other embeddings may be associated with respective other nodes of the graph 120. In examples where the SSL model 130 comprises multiple (N) encoders 132, the feed-forward layers 134 of one encoder may feed into the attention layers 133 of another encoder of the N encoders.

Each embedding of the plurality 140 may be a multi-dimensional vector in latent space and may correspond to particular aspects of the data 110 associated with a given node.

As part of a pre-processing task (not shown), data represented by the graph 120 may be reversibly encoded by additional layers of the neural network of the SSL model 130 that precede the attention layers 133. For instance, the SSL model 130 may further comprise embedding and encoding layers, such as a multi-layer perceptron (MLP), that may receive the graph 120 as input and apply encoding operations (such as sine/cosine embeddings for continuous data values) to generate an encoded set of features. Similarly, a second MLP may operate on the plurality of node embeddings 140 (that is, take the nodes embeddings as an input from the feed-forward layers 134) to transform them into embedded data.

In the example of FIG. 1, the plurality of embeddings 140 is transmitted to a downstream machine learned model 150 associated with the first vehicle 102. According to another example, at least one of the plurality of embeddings may be transmitted to the downstream model 150. The downstream model 150 may be part of the vehicle systems of the vehicle 102 (referred to as on-vehicle or online systems) and may be trained to output control data 160 based at least in part on an embedding of the plurality 140, where the control data 160 may be configured to control the first vehicle 120. The control data 160 may comprise a certain shape, size or form of data (e.g., scalar, vector, classification, labels, regression target, trajectory) suitable for a specific task or for other entities within the vehicle systems to further process in order to control the vehicle 120, whereby the downstream machine learned model 150 is configured to transform the plurality of embeddings 140 into the desired shape, size, or form of control data 160.

Alternatively, the downstream model 150 may be a part of remote computer systems associated with the vehicle 102 but not located on the vehicle 102 (referred to as off-vehicle or offline systems), where the control data 160 may be configured to control another vehicle. In examples, the downstream model 150 may be configured to perform various offline tasks such as determining scenario similarity, difficulty modeling and classification. The downstream model 150 may comprise one or more heads configured for different functionalities such as the aforementioned scenario similarity, difficulty modeling and classification functions.

In examples, the machine learned model 150 may itself be a multi-layer perceptron (MLP) or, as described above, an MLP may first receive the plurality of embeddings 140 to process them in some way (e.g. encode) before transmitting the embeddings 140 to the machine learned model 150. The processing performed by an MLP on the embeddings may transform the embeddings from Batch size (B)×Number of Nodes (N)×Dimensionality (D) to B×N×D', where D' is a new dimensionality.

Figure 9:
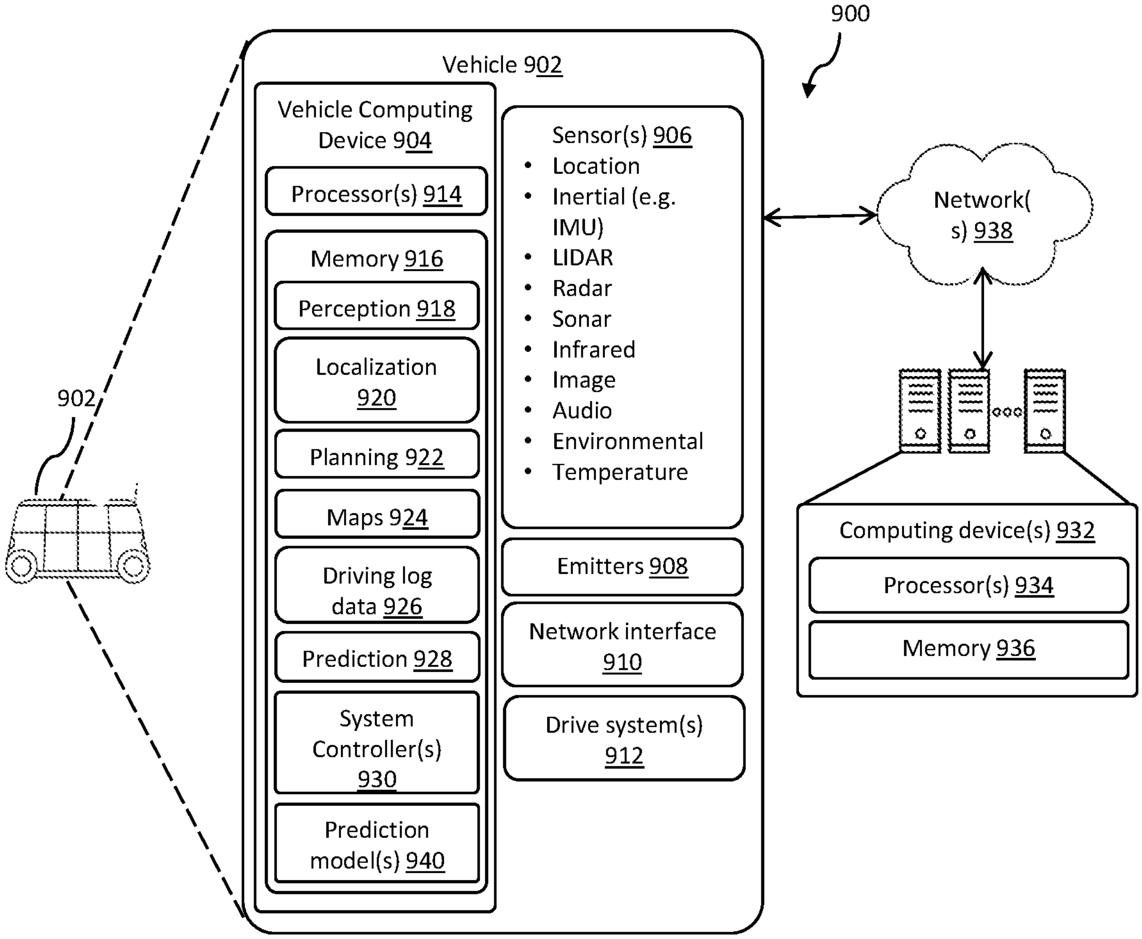
FIG. 9 is a block diagram of an example system that implements the techniques discussed herein.

The downstream model 150 may be a part of a perception vehicle system (configured to detect object(s) in in an environment surrounding the vehicle 102), a planning vehicle system (configured to determine instructions for controlling operation of the vehicle) or a prediction vehicle system (configured to generate predicted trajectories of objects in an environment), explained in more detail in relation to FIG. 9. Examples of the downstream model 150 include:

- a learned cost-to-go model to output an estimated cost of performing one or more actions to arrive at a desired state;
- a prediction model to provide predicted states associated with one or more objects in the environment;
- a model to determine validity or verification of the system;
- a model to determine probability (likelihood) of a certain scenario occurring (e.g., disengagement from autonomous operation, occurrence of undesired behaviour);
- a reinforcement learning model; and
- a scene diffusion model.

Figure 6:
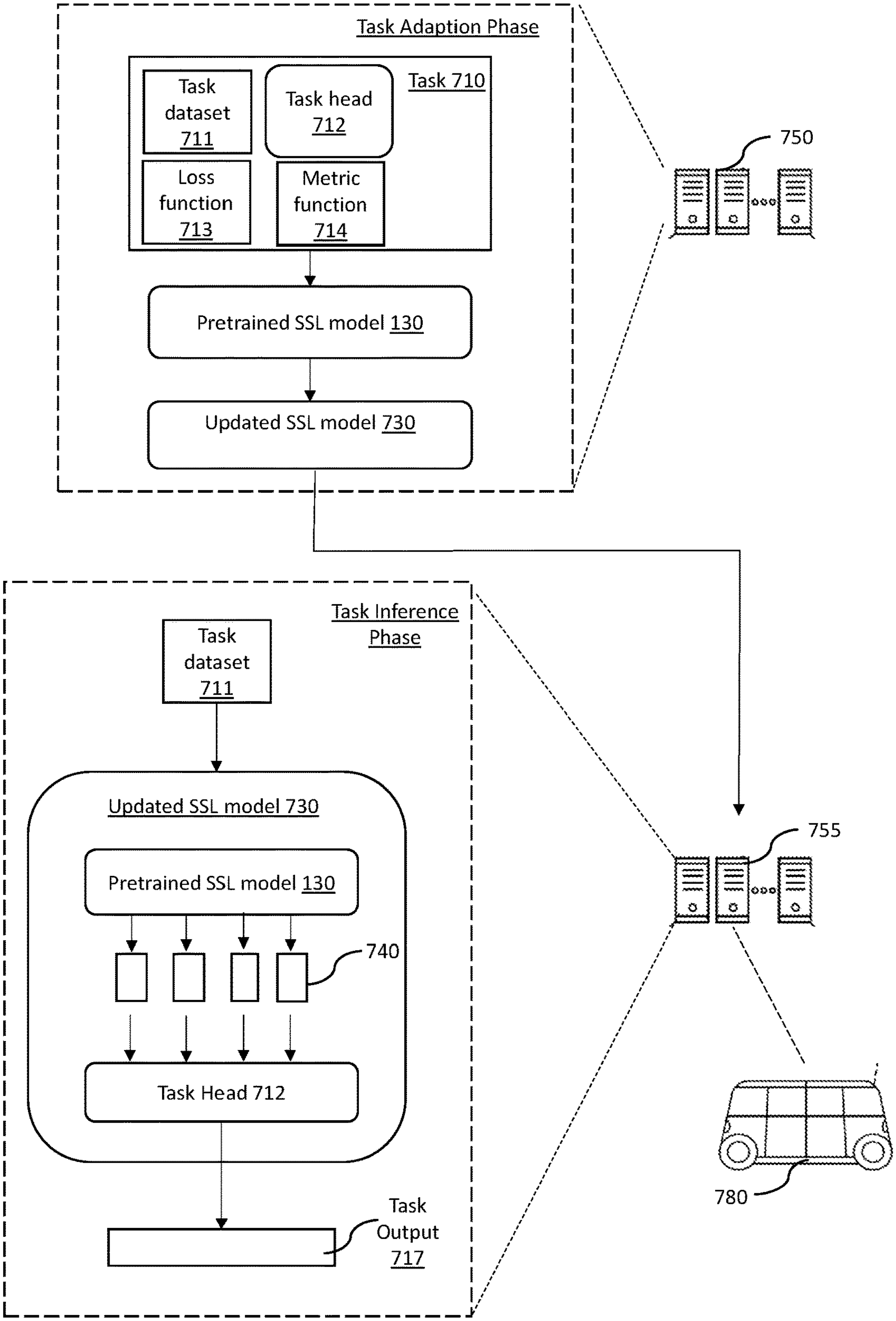
FIG. 6 is a schematic diagram of an exemplary system for adapting a pretrained machine learned model.
Figure 7:
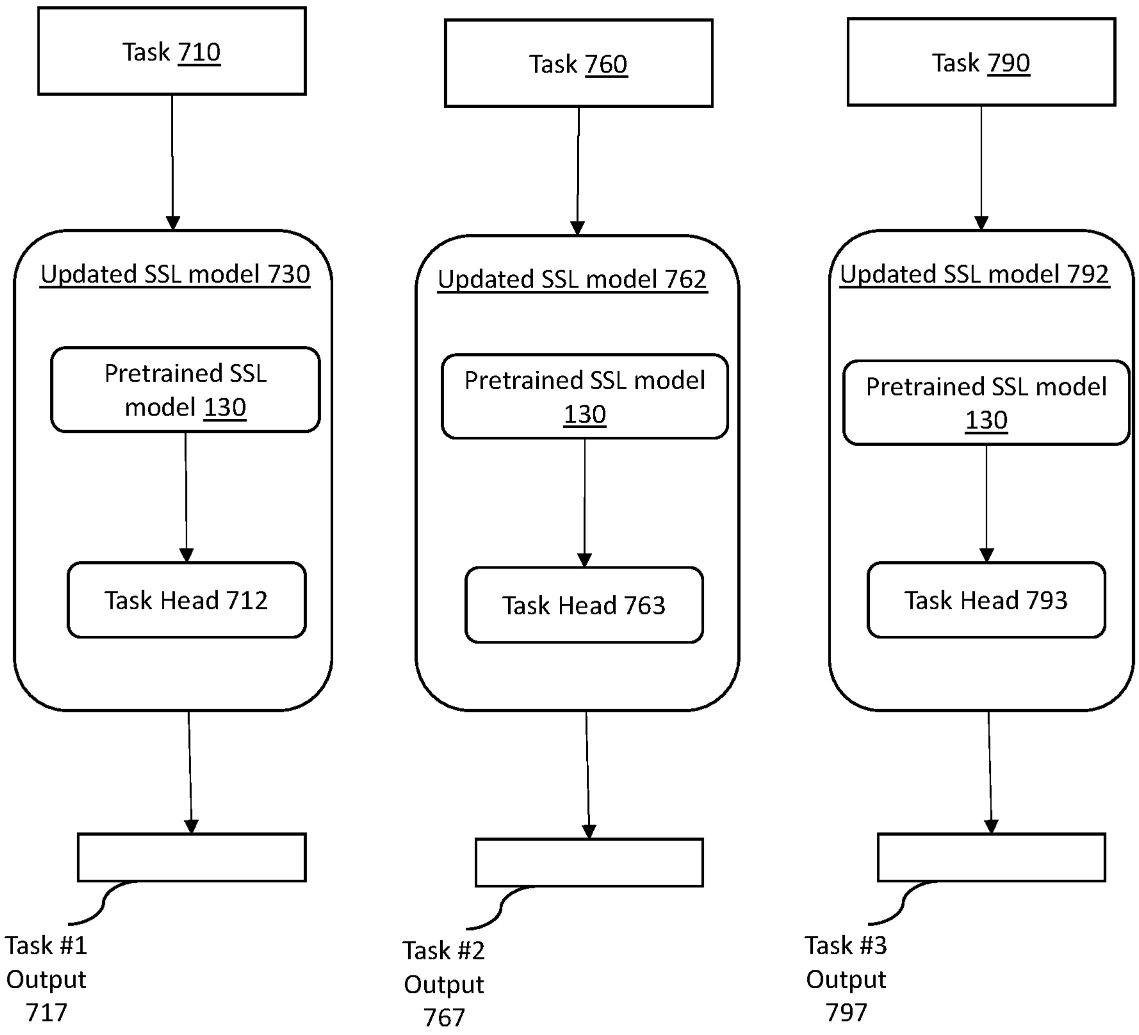
FIG. 7 is a schematic representation of using a pretrained machine learned model to perform parallel adaptation tasks, according to an example.
Figure 8:
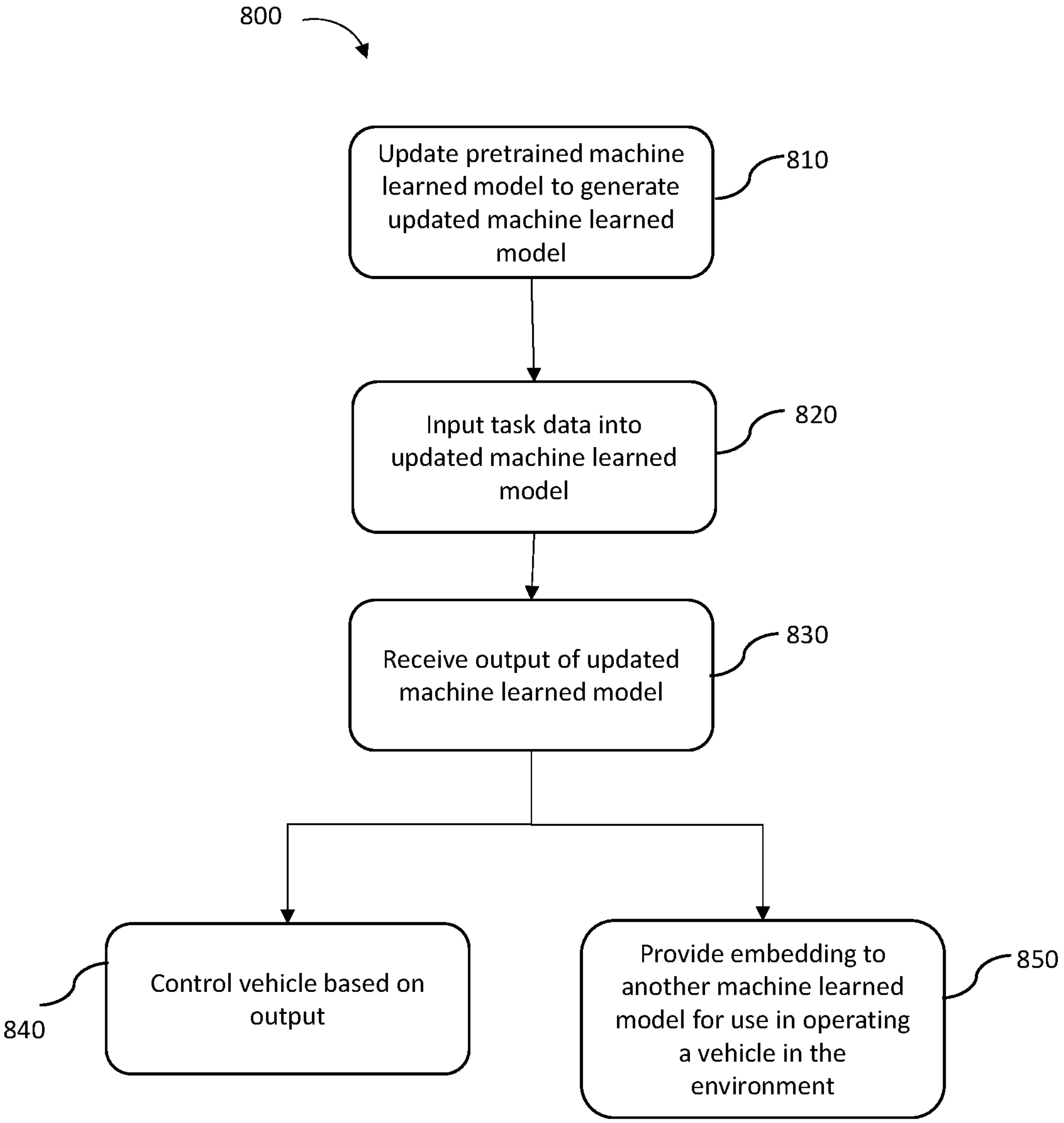
FIG. 8 is a flow chart of a method of adapting a pretrained machine learned model, according to an example.

In some examples, the downstream model 150 may be a task-specific model or task head, described in more detail in relation to FIGS. 6-8, whereby the SSL model 130 is a backbone (or backbone) machine learned model that may generate the node embeddings that may be transferable to different tasks.

Whilst the example of FIG. 1 is described in relation to the SSL Model 130 being executed on-vehicle, in an alternative arrangement, the SSL Model 130 and the downstream ML model 150 may both be executed off-vehicle. Examples of off-vehicle applications using such an arrangement include automated triage, scene clustering, analysis of performance metrics, and generation of performance related statistics, where performance may relate to the performance of at least one of the SSL model 130; the downstream ML model 150; and the driving performance of the vehicle 102.

Training Phase

Figure 2:
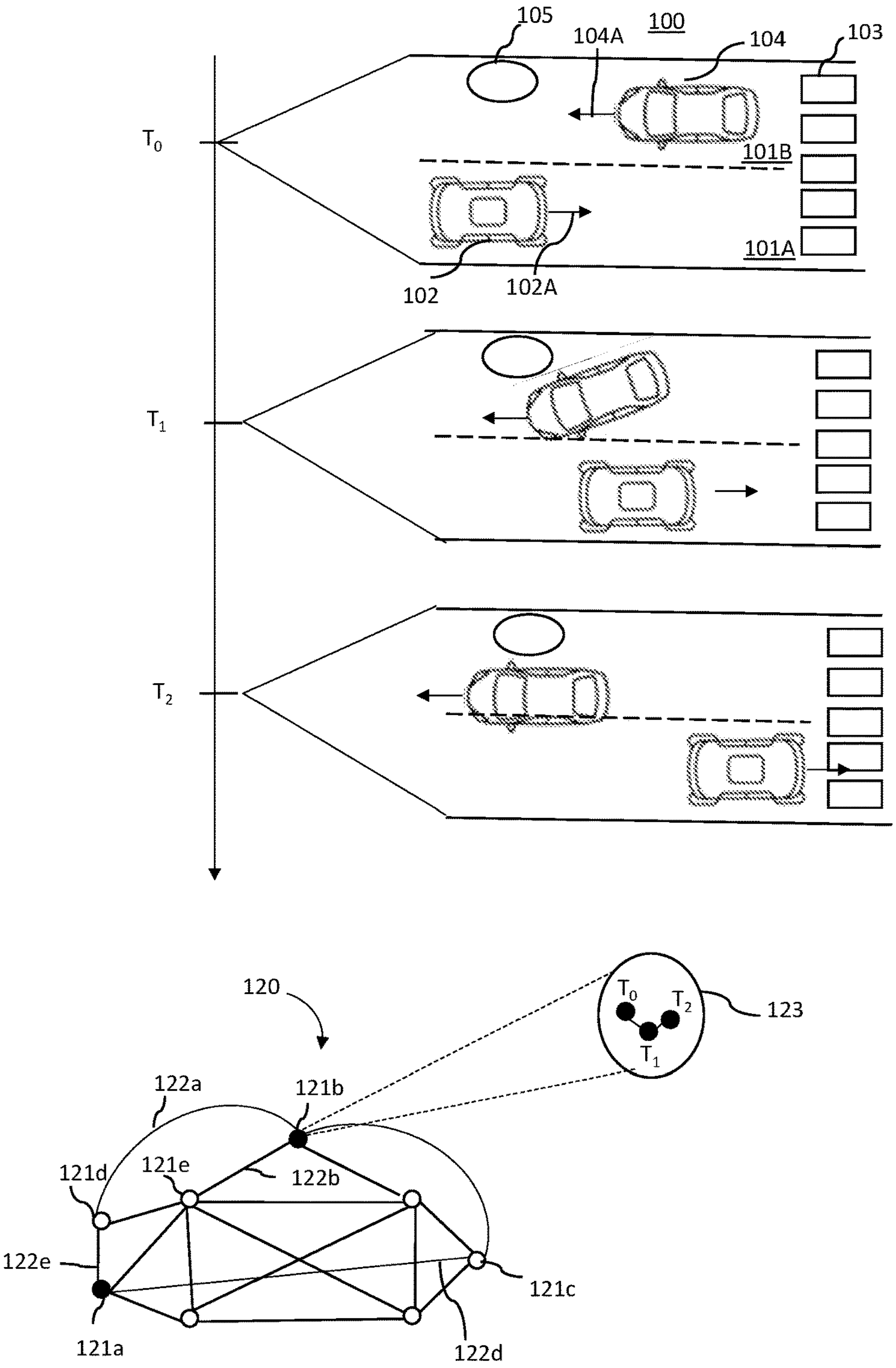
FIG. 2 is a simplified schematic diagram of a graphical representation of an environment.

During a training phase, training data for the SSL model 130 may comprise the graph 120 (generated as described in relation to FIG. 2). A portion of the training data corresponding to a node 121 of the graph 120 may be masked, so that the training data comprises a masked portion 125 of training data and an unmasked portion of training data. The masking operation may be carried out by setting a portion of training data to a constant. Different ways of masking data are described in more detail in relation to FIG. 3. Masking one or more nodes is a way of training the SSL model 130 to reconstruct the scene of the environment by predicting what was missing from the input training data (that is, the masked portion) using the unmasked portion of training data, since the unmasked portion may comprise data that suggests there may be another feature of the environment (for example, an additional vehicle) that was not present in the input data.

The masked portion 125 and the unmasked portion of the training data may be input to the SSL model 130. For the training phase, the SSL model 130 may comprise the encoder 132 and a decoder 136, where the decoder 136 may comprise a plurality of reconstruction layers 137. The encoder 132 may be configured to generate a plurality of node embeddings 142 for each of the nodes present in the unmasked portion of training data. Since the masked portion 125 of training data corresponds to the node 121, the encoder may not generate a node embedding for this node (represented by dashed outline adjacent the embeddings 142).

The plurality of node embeddings 142 may be input to the decoder 136. The reconstruction layers 137 may output a proposed embedding 143 associated with the masked portion of training data (in this example the node 121) based on and in addition to the node embeddings 141 associated with the unmasked portion of training data. In examples, the reconstruction layers 137 may comprise one or more multilayer perceptrons (MLPs). In other examples, the reconstruction layers 137 may comprise transformer layers.

As well as outputting the proposed embedding 143, the reconstruction layers 137 also output the plurality of node embeddings 142 that may be changed in some way by the reconstruction layers 137, for example, to compute metrics relating to the associated nodes or metrics for the SSL model. Alternatively, the node embeddings 142 may pass through the reconstruction layers 137 with little or no (no-op) changes being applied.

The proposed embedding 143 may be compared to a ground truth 145 that is associated with the masked portion of training data 125, such as a node embedding derived from the masked portion of the training data. Based at least in part on the comparison, a loss may be determined, for example, as a result of a loss function being applied to the proposed embedding 143 and the ground truth 145. The loss may be a reconstruction loss that represents how accurate the SSL model 130 was in reconstructing the scene of the environment by its generation of the proposed embedding 143 that corresponds to the node that was missing from (masked within) the input training data. The reconstruction loss may be determined for continuous values (such as a value that may vary continuously, e.g., a position) using a mean-squared error (MSE) calculation, whereas a cross-entropy loss may be determined for discrete values (such as a value that does not change, e.g., a classification).

The SSL model 130 may be updated based on the loss. For example, one or more parameters of the SSL model 130 may be updated to minimize the loss. In some examples, gradients may be derived based on the loss and then backpropagated through the layers 133 and 134 of the SSL model 130.

In some examples, after completion of a training phase, the performance of the SSL model 130 may be tested using test data after which the SSL model 130 may undergo further training, as described above under the "Training Phase" heading. If the SSL model 130 is determined to satisfy a performance criterion, the decoder 136 may be discarded and the SSL model 130 may be deployed to vehicle computing systems associated with one or more autonomous vehicles, where the vehicle computing systems may be online or offline, for use during inference phases, as described above under the "Inference Phase" heading. The SSL model 130 may be stored in persistent memory on the vehicle computing systems for downstream use (described in relation to FIG. 1) or for task adaptation (described in relation to FIGS. 6-9).

FIG. 2 shows a simplified schematic diagram of a graphical representation of an environment, such as the graph 120 of FIG. 1.

As explained above, a scene of an environment, such as environment 100, may change over time, for example, over a series of time steps $T_0$ to $T_2$. In the example of FIG. 2, at time step $T_0$, the first vehicle 102 may be travelling in the direction of arrow 102A along the road and the second vehicle 104 may be travelling in the direction of arrow 104A in the opposite direction to the first vehicle 102.

At time step $T_1$, the first vehicle 102 may have progressed further along the road towards the crosswalk 103, whilst the second vehicle 104 may have started to change direction and manoeuvre around the object 105.

At time step $T_2$, the first vehicle 102 may have reached the crosswalk 103 and the second vehicle 104 may be passing the object 105 bordering the central line dividing the first and second lanes 101A and 101B of the road 101.

The graph 120 may be representative of data relating to the environment 100 over the series of time steps $T_0$ to $T_2$. The data relating to the environment may comprise a number of features, also referred to herein as entities, within the environment, such as static and dynamic features. Examples include a vehicle, a pedestrian, and a road feature, where the road feature comprises at least one of a speed limit, a curvature of the road, a gradient of the road and a junction or intersection with another road. A static feature may be fixed over time, such as the curvature, width, speed limit of a road, whereas a dynamic feature may have some properties that change (or have potential to change) over time, such as vehicle or pedestrian, which may change direction, speed, and acceleration.

As described in relation to FIG. 1, the graph 120 may comprise a plurality of nodes 121, each of which may be associated with an entity. In the example of FIG. 2, the first vehicle 102 is associated with node 121*a* (colored black) and the second vehicle 104 is associated with the node 121*b* (colored black). The other nodes (colored white) in the graph 120 are associated with the other features in the environment, specifically:

node 121*c* is associated with the crosswalk 103;

node 121*d* is associated with object 105; and node 121*e* is associated with the second lane 101B.

Each node relating to a dynamic feature, for example, node 121*b*, may be a group of sub-nodes 123, where each node of the group 123 is associated with a respective time step $T_0$ to $T_2$. Static features may be associated with respective single nodes, such that a set of static features is associated with a corresponding set of nodes.

The graph 120 may also comprise a plurality of edges 122, where there is at least one edge between a first node and another node of the plurality. An edge may be representative of a relationship between the features associated with the nodes that the edge connects, such that the graph 120 is constructed within semantic space and defines features of the environment with respect to one another based on their meaning (relevance) to one another. For instance, an edge may be directional and not all pairs of nodes will have any edge therebetween or an edge in both directions. The direction of an edge may be representative of the relevance of one node or data relating thereto to another, and the flow of data therebetween, in such scenarios, the graph 120 may be a directed graph. For instance, the node 121*c* representative of a static feature such as the crosswalk 103 may have an outgoing edge to the node 121*a* representative of a dynamic feature such as the first vehicle 102, whereas there may be no outgoing edge from the node 121*a* associated with the first vehicle 102 to the node 121*c* associated with the crosswalk 103.

The flow of data and the edge directionality representative thereof may be representative of how the attention layers 133 may process the graph 120 and the data relating to each node, for instance, the directionality may affect the determination of the structure of one or more attention matrices using in attention operations by the attention layers 133. For example, an N×N attention matrix may have a mask applied that down-weights certain parts of data (e.g. nodes associated with dynamic features) with respect to other parts of data (e.g. nodes associated with static features), to reflect the directionality of the edges (in this case, that information does not flow from dynamic features to static features). This means nodes that are associated with dynamic features may be attended based on data of nodes associated with static features (e.g., features defining the road network (lane width, curvature and gradient, etc.), but not vice versa. In examples, the attention matrix may have a mask that down-weights data relating to nodes that are not deemed to be adjacent to a given node, since nodes that are further away may have less of an effect on a given node's behavior, where adjacency may be defined based on position or another attribute, relative to the given node.

For simplicity, the graph 120 of FIG. 2 does not show the directionality of the edges. The node 121*a* associated with the first vehicle 102 is connected via an edge 122*d* to the node 121*c* associated with the crosswalk 103. The node 121*a* is also connected via an edge 122*e* to the node 121*d* associated with the object 105. Accordingly, the edges 122*d* and 122*e* represent that the behavior of the first vehicle 102 is dependent on or related to at least the features relating to the object 105 and the crosswalk 103, for instance, the location, size and speed of the object 105 and the distance from the crosswalk 103.

The node 121*b* associated with the second vehicle 104 is connected via an edge 122*b* to the node 121*e* associated with the second lane 101B of the road 100. The direction of edge 122*b* may be outgoing from the node 121*e* (static feature) to the node 121*b* (dynamic feature). The node 121*b* is also connected via an edge 122*a* to the node 121*d* associated with the object 105. Again, the direction of the edge 122*a* may be outgoing from node 121*d* to node 121*b*. Accordingly, the edges 122*b* and 122*a* represent that the behavior of the second vehicle 102 is dependent on or related to at least the features relating to the object 105 and the second lane 101B of the road 100, for instance, the location, size and speed of the object 105 and the width of the second lane 101B.

In a scenario where the SSL model 130 is being run off-vehicle, the data 110 may be processed as batches by a processing entity to generate the graph 120. The graph 120 may be loaded in batches onto a central processing unit (CPU) and then sent to a graphical processing unit (GPU).

On the other hand, where the SSL model 130 is being run on-vehicle, the data 110 may be streamed from the entity that captured the data (e.g., sensors, perception computing system) directly to the CPU, where the data 110 may then be processed to generate the graph 120, which may then be moved to the GPU. Alternatively, the GPU may receive the data 110 and generate the graph 120 rather than receiving the graph 120 from the CPU.

In either case, for each node in the graph 120, a vector may be generated that is representative of the state of the feature associated with the node. For example, for node 121*b* associated with the second vehicle 104, a vector may be generated that defines a state comprising different attributes of the second vehicle (for example, speed, direction of travel, position, vehicle type (classification) etc.) Each vector may also be encoded.

Since each feature within the environment is different and is therefore defined by different attributes, the associated vectors may be different lengths. In order to achieve the same dimensionality for each vector, in the off-vehicle scenario, the processing entity may input the different vectors into a multi-layer perceptron (MLP) or other set of differentiable layers to project the different vectors into the same dimensionality, such that the nodes in the graph 120 are each defined in the same dimension. Then, these vectors may be input to the SSL model 130. In the on-vehicle scenario, the GPU may render the graph 120 such that the graph 120 comprises vectors having the same dimensionality, where the rendered graph 120 is input to the SSL model 130.

In a similar fashion to the off-vehicle and on-vehicle variations described above in relation to the inference phase, the training phase of the SSL model 130 may process the data 110 in batches or by streaming the data 110.

Figure 3:
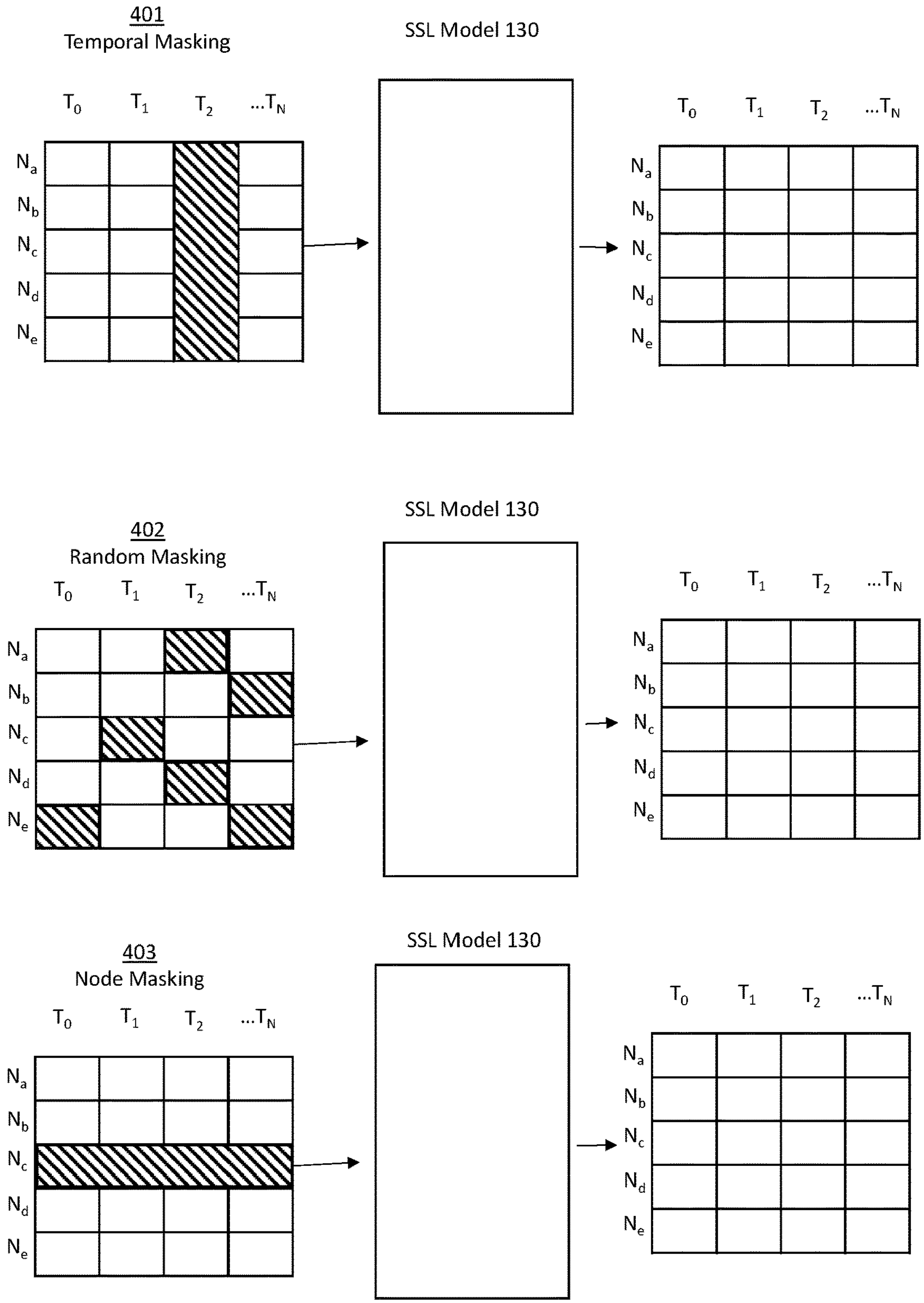
FIG. 3 is a schematic representation of example masking operations that may be applied in a training phase of a self-supervised machine learned model.

FIG. 3 is a schematic representation of example masking operations that may be applied in the training phase of an SSL model, such as the "Training Phase" described in relation to the SSL model 130 of FIG. 1. In some examples, a single masking operation may be applied in the training phase. In other examples, multiple different masking operations may be applied in the training phase.

The determination of a masking operation to be applied in the training phase of the SSL model 130 may depend on the application of the SSL model 130 in an inference phase, such as, a type of downstream model 150 that the SSL model 130 may be used in combination with during an inference phase and thus the desired qualities of the plurality of node embeddings 140. For example, where the SSL model 130 is to be used in combination or as part of a prediction model during inference, the SSL model 130 may be trained using a temporal or causal masking operation (described in relation to 401 of FIG. 3). In another example, where the SSL model 130 is to be used during inference to determine static objects within an environment, the SSL model 130 may be trained using node masking (described in relation to 403 of FIG. 3). In this way, where an application or task relating to the SSL model 130 during inference is known at the training stage, the one or more masking operations may be designed to correspond to that task or operation.

A first type of masking operation 401 is represented in FIG. 3. The first type of masking operation 401 may be a temporal masking operation whereby data associated with one or more time steps is masked prior to being input to the SSL Model 130. In the example of FIG. 3, data relating to time step $T_2$ is masked (shown using diagonal black lines). The SSL model 130 is trained to predict data for the masked portions that were input based at least in part on the unmasked portions of data, whereby its prediction may take the form of a node embedding for the masked portion, as described in relation to FIG. 1. In this way, the SSL model 130 may be trained to predict data relating to a specific time step based on data relating to previous (e.g., time steps $T_0$ and $T_1$) and future time steps (e.g., $T_N$), for instance, the position, behavior, speed, direction of travel of dynamic features within the environment, such as vehicles, pedestrians or other objects. In other examples, a temporal masking operation may comprise causal masking whereby data associated with each time step ahead of a point in time would be masked, for instance, referring to the operation 401, where $T_1$ is the point in time, all time steps from $T_2$ onwards to $T_N$ would be masked. In this way, the SSL model 130 may be trained to predict the future position, behavior, speed, direction of travel of dynamic features within the environment. In other examples, a temporal masking operation may comprise span masking whereby data associated with consecutive time steps ahead of a point in time would be masked, for instance, referring to the operation 401, where $T_0$ is the point in time, time step $T_1$ and $T_2$ would be masked.

A second type of masking operation 402 is a random masking operation, whereby random data associated with different time-steps and different nodes is masked prior to being input to the SSL Model 130. A masking ratio may be provided that defines how much of the data should be masked using the random masking operation. For example, the masking ratio may be 10%, 25%, 40%. In this way, the SSL model 130 may be trained to predict missing information relating to each time step and each node based on the information relating to the same and other time steps and the same and other nodes. As a result of this type of masking operation in a training phase, the SSL model 130 may be trained to predict information that may be occluded from the input data associated with the environment, for example, a feature (such as road surface water or a pothole) may be hidden from view from sensors collecting data representative of the environment and thus not be defined within said data (and thus be considered an occlusion). In this scenario, in an inference phase, the SSL model 130 may predict the presence of the hidden feature in the environment, based on characteristics (speed, position, behavior) of other features within the environment.

A third type of masking operation 403 is a node-centric masking operation, whereby data relating to a particular node (across all time steps) is masked prior to being input to the SSL Model 130 and the SSL model 130 predicts the presence and other characteristics of the masked node. In a similar way to the second type of masking operation described above, as a result of using the third type of masking operation in a training phase, the SSL model 130 may be trained to predict the presence of a feature in the environment that was not defined (or occluded) within the input data and determine behaviour of that feature, based on the behaviour of the other known features defined within the unmasked input data.

The masking operations depicted by FIG. 3 are not exhaustive and other masking operations may be used in the training phase of the SSL Model 130.

Figure 4:
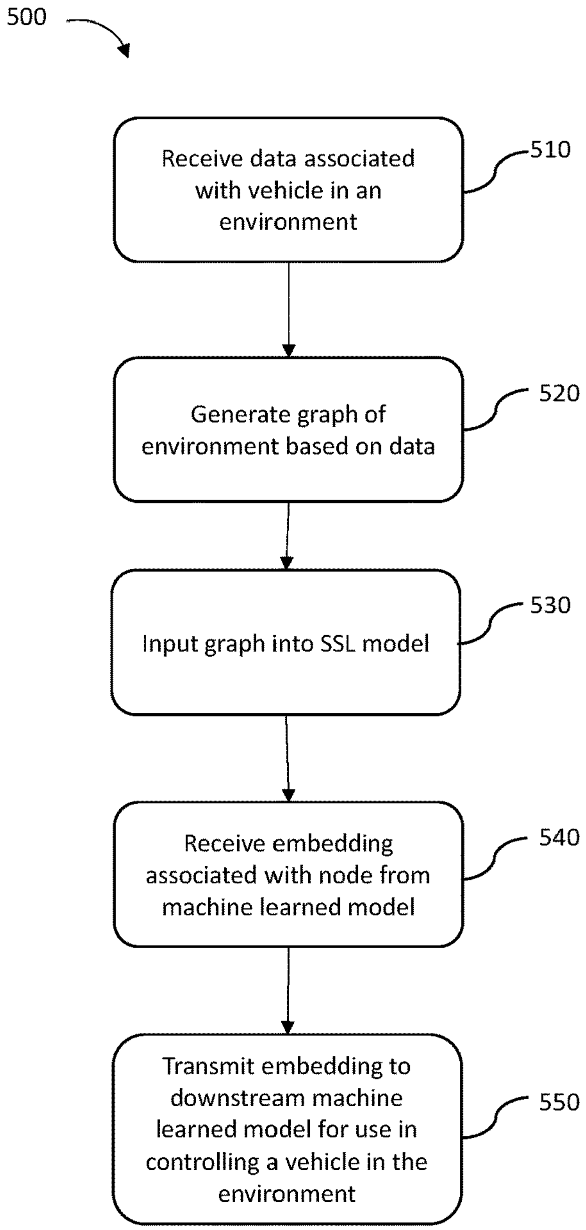
FIG. 4 is a flow chart of a method of using a self-supervised machine learned model, according to an example.

The inference phase of FIG. 1 may be summarized as a flow chart, such as the flow chart 500 of FIG. 4. The method 500 may be performed at one or more computing devices, such as a computing device of the vehicle 102 or a remote computing device (such as 932 of FIG. 9).

At step 510, data associated with a vehicle operating in an environment may be received.

At step 520, a graph may be generated based at least in part on the data. The graph, such as graph 120, may comprise a plurality of nodes, where a node of the plurality is associated with one or more of a vehicle operating in the environment, a road feature, an additional vehicle, or a pedestrian.

At step 530, the graph may be input to an SSL model, such as model 130 of FIG. 1. The SSL model may comprise an encoder and be trained to output an embedding associated with the node.

At step 540, an embedding associated with the node may be received from the SSL model.

At step 550, the embedding may be transmitted to a downstream machine learned model trained to output control data based at least in part on the embedding, where the control data is configured to control the vehicle or another vehicle.

Figure 5:
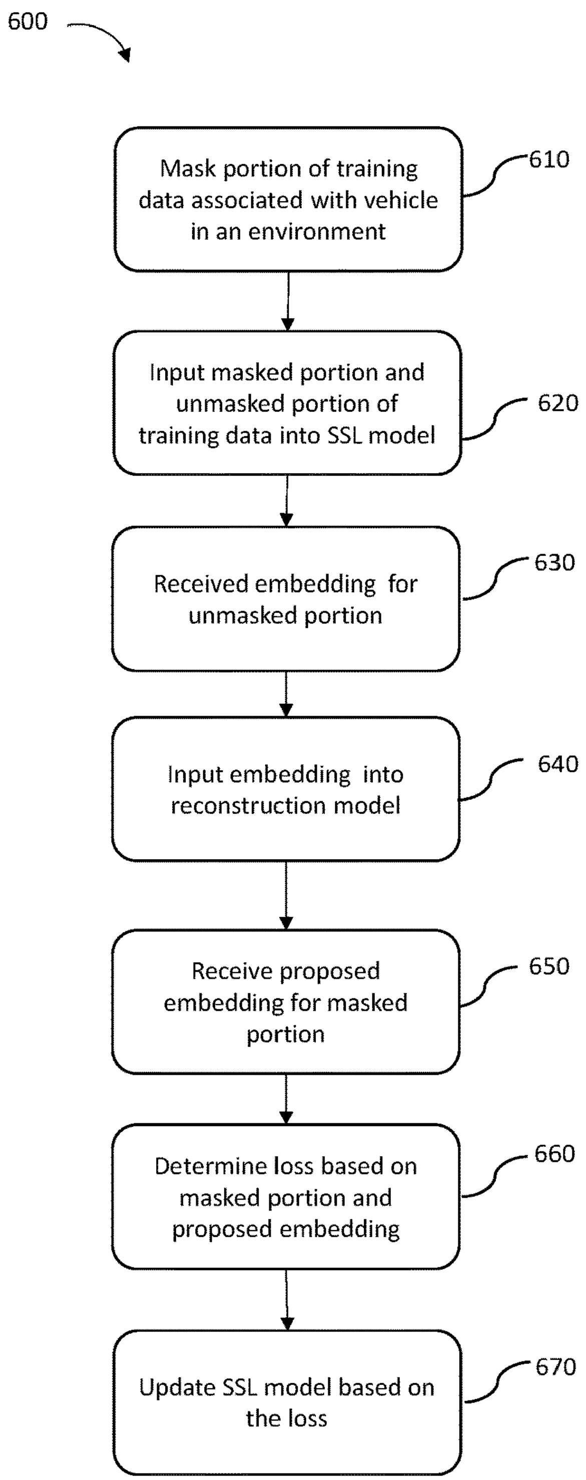
FIG. 5 is a flow chart of a method of training a self-supervised machine learned model, according to an example.

The training phase of FIG. 1 may be summarized as a flow chart, such as the flow chart 600 of FIG. 5. The method 600 may be performed at one or more computing devices, such as the remote computing device 932 of FIG. 9.

At step 610, a portion of training data may be masked generating a masked portion of training data and an unmasked portion of training data, where the training data is associated with a vehicle operating in an environment.

At step 620, the masked and unmasked portions of training data may be input to the SSL model.

At step 630, an embedding associated with the unmasked portion of the training data may be received.

At step 640, the embedding for the unmasked portion of the training data is input to a reconstruction model, comprising, for example, an MLP or transformer architecture.

At step 650, a proposed embedding associated with the masked portion of the training data may be received from the reconstruction model.

At step 660, a loss may be determined based at least in part on the masked portion of the training data and the proposed embedding. For example, the masked portion of the training data may be regarded as the ground truth.

At step 670, the SSL model may be updated based on the loss.

Task Adaptation of Self-Supervised Learned Model

FIG. 6 is a schematic diagram of a system configured to adapt so as to fine-tune a self-supervised model, such as the SSL model 130, for a specific task, according to an example.

In a task adaptation phase, a pretrained SSL model 130 such as those described in relation to FIGS. 1-5 may be received by a computing system 750. As described in relation to FIGS. 1-5, the SSL model 130 may be configured to output a plurality of embeddings based at least in part on an input comprising a graph 120 representing an environment 100 through which a vehicle is traversing, where a node of the graph 120 comprising, as an embedding, a vector encoding.

A task 710 may also be received by the computing system 750. The task 710 may comprise at least one of the following: a task head 712 to append to the pretrained model 130 or an identifier thereof; a task dataset 711; a loss function 713; or a metric function 714.

The task head 712 may be a function that comprises one or more layers of a neural network comprising a plurality of parameters defined in relation to the task 710 to be appended to the pretrained model 130, where the task head 712 is configured to perform a specific task, task 710. In examples, the task head 712 may be a decoder. In examples, the task head 712 may be a function that comprises a model that is not machine learned or may comprise an operation to be applied to the pretrained SSL model 130.

The task dataset 711 may comprise a set of data that is to be processed by an updated version of the pretrained SSL model 130 (referred to as updated SSL model 730) in order for the task to be performed. The loss function 713 may be used to determine a loss between an output of the task head 712 and a ground truth value. The metric function 714 may be used to evaluate the performance of the updated SSL model 730.

The pretrained SSL model 130 may be updated, based at least in part on the task 710, to generate an updated machine learned model 730, also referred to as the updated SSL model 730. The updating may comprise updating a subset of parameters of a layer of the pretrained SSL model 130, where a subset may comprise all or some of the parameters (sometimes referred to as an improper subset in a mathematical context). Updating in this way may be performed as a Low-Rank update (also referred to as LoRa), whereby a portion of the existing parameters of the pretrained SSL model 130 are frozen and new parameters are incorporated into the SSL model 130 by the addition of update matrices to some of the existing parameters. Another example of updating some or all of the parameters is a Full update that may be performed with respect to the pretrained SSL model 130, whereby all the existing parameters of the pretrained SSL model 130 are updated based at least in part on the task 710.

Additionally, or alternatively, the updating may comprise appending the task head 712 to the pretrained SSL model 130 such that an output of the SSL model 130 may be input to the task head 712 and the task head 712 may be configured to generate an output based at least in part on the output of the SSL model 130. In examples, where the task head 712 comprises new parameters and the pretrained SSL model remains unchanged, this may be referred to as a Frozen update.

In some examples, the updating may further comprise training the pretrained SSL model and the task head 712 using training data, such that, the task head 712 may be updated based on a determined loss with the pretrained SSL model remaining unchanged (frozen). Alternatively, the training may be end to-end-training of the SSL model 130 and the task head 712 whereby both the model 130 and the task head 712 may be updated at the same time.

Additionally, or alternatively, the updating may comprise downscaling the pretrained SSL model 130 by removing one or more of its parameters. The downscaling may be performed so that the SSL model 130 is reduced to a smaller size (possibly predetermined) such that it can more easily run on-vehicle where there are fewer computing and memory resources available compared to off-vehicle.

As an alternative to updating the pretrained model 130 to generate the updated SSL model 730 in the ways described above, the updated SSL model 730 may comprise a further machine learned model, smaller in size compared to the pretrained model 130. The further machine learned model may be trained based on the output of the pretrained model 130 to mimic the output of the pretrained model 130; this may be referred to as a teacher-student configuration. In this way, the further machine learned model takes advantage of the knowledge of the pretrained machine learned model 130 without itself requiring intensive training with a large amount of training data (that was used to train the pretrained model 130).

The updated SSL model 730 may be deployed to a vehicle computing system 755 associated with a vehicle 780 configured to be controlled based at least in part on an output of the updated SSL model 730. In examples, the vehicle 780 may correspond to the vehicle 102 (FIG. 1).

In a task inference phase, after the updated SSL model 730 has been deployed, the task 710 may be performed, as described below.

The task dataset 711 may be input to the updated SSL model 730. In the example of FIG. 6, for simplicity, the updated SSL model 730 is depicted as comprising the pretrained SSL model 130 and the task head 712. In practice, as described above, the SSL model 130 may or may not be equivalent to its original form (that is, comprise its existing parameters as in the Frozen update) as some or all of its parameters may be updated in the LoRa or Full update methods. The updated SSL model 730, specifically, the pretrained model 130 may output a plurality of embeddings 740, each embedding of the plurality may be associated with a particular aspect of the task dataset 711. The plurality of embeddings 740 may be input to the task head 712 that is configured to perform the specific task in relation to the plurality of embeddings 740. A task output 717 may be received from the task head 712. The task output 717 may be used by the vehicle computing system 755 as basis for controlling the vehicle 780.

In some examples, the computing systems 750 and 755 may be the same.

The task to be performed and thus defined by task 710 may be at least one of the following:

- detecting one or more objects within the environment (whether static or dynamic);
- predicting a trajectory for an object within the environment;
- predicting an attribute associated with the object;
- clustering a driving scenario;
- grouping a driving scenario based on driving behavior;
- determining similarity between driving scenarios;
- determining whether driving behavior is comparable for similar driving scenarios;
- predicting a likelihood of a collision associated with a dynamic object within the environment;
- predicting difficulty of a driving scenario for planner component;
- predicting one or more features of a driving scene;
- determining nearest-neighbor for one or more node embeddings;
- determining one or more active (dynamic) agents (vehicles, pedestrians, other moving objects) in a scene; and determining a relevancy score for an object (dynamic and/or static) within the environment.

In examples, a performance metric for the updated SSL model 730 may be determined based at least in part on the task output 717. The performance metric may be determined based on the metric function 714 of the task 710. It may be determined that the performance metric satisfies a performance threshold associated with the updated SSL model 730. In examples where the performance threshold is satisfied, the updated SSL model 730 may be deployed to other vehicle computing systems associated with other vehicles for execution of the task 710 in relation to those other vehicles.

FIG. 7 is a schematic diagram of parallel adaptation tasks, according to an example. The pretrained SSL model 130 may be updated based on the task 701 and two other tasks 760 and 790 in parallel, whereby the updating occurs independently and results in three different versions of the updated SSL model 730, 762 and 792. The three different versions may be specifically adapted for the respective corresponding task. The first version of the updated SSL model 730 may comprise a first task head 712, as described in relation to FIG. 6. The second version of the updated SSL model 762 may comprise a second task head 763 and the third version of the updated SSL model 792 may comprise a third task head 793. Each of the updated SSL models 730, 762 and 792 may generate respective task outputs 717, 767 and 797.

FIG. 8 is a flow chart of a method 800 of adapting a pretrained SSL model, according to an example. Step 810 comprises updating a machine learned model pretrained to generate an output associated with a feature of an environment (such as model 130) based at least in part on a task associated with operating a vehicle in the environment, thereby generating an updated machine learned model (such as model 730, FIG. 6).

At step 820, data associated with the task is input to the updated machine learned model.

At step 830, an output of the updated machine learned model is received, where the output is associated with a feature of the environment and generated based at least in part on the task.

The method then proceeds to at least one of step 840 or step 850. At step 840, the vehicle is controlled based at least in part on the output received in step 830. In step 850, the updated machine learned model is deployed to a vehicle computing system associated with the vehicle or multiple vehicle computing systems associated with respective vehicles.

Automatic Adaptation

Referring back to FIG. 6, the task 710 may be received at the computing system 750 from a user operating a client device or other computing system, whereby the user specifies one or more of the task head 712, the task dataset 711, the loss function 713 and the metric function 714.

Updating the pretrained SSL model 130 to the updated SSL model 730 may occur automatically in response to receipt of the task 710 and or the task dataset 711. In this way, explicit supervision or coding by the user or operator of the computing systems involved (such as systems 750 and 755) may not be required.

System Overview

FIG. 9 illustrates a block diagram of an example system 900 that implements the techniques discussed herein. In some instances, the example system 900 may include a vehicle 902, which may represent the vehicle 102 in FIG. 1. In some instances, the vehicle 902 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 902 may be a fully or partially autonomous vehicle having any other level or classification.

The vehicle 902 may include a vehicle computing device(s) 904, sensor(s) 906, emitter(s) 908, network interface(s) 910, and/or drive system(s) 912. Sensor(s) 906 may represent sensor(s) 104. The system 900 may additionally or alternatively comprise computing device(s) 932. The vehicle computing device 904 may be configured to perform the method 500 of FIG. 4, the method 600 of FIG. 5, and the method 800 of FIG. 8.

In some instances, the sensor(s) 906 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 906 may include multiple instances of each of these or other types of sensors. For instance, the radar sensors may include individual radar sensors located at the corners, front, back, sides, and/or top of the vehicle 902. As another example, the image sensors may include multiple cameras disposed at various locations about the exterior and/or interior of the vehicle 902. The sensor(s) 906 may provide input to the vehicle computing device(s) 904 and/or to computing device(s) 932. Additionally, or alternatively, the sensor system(s) 906 can send sensor data, via the one or more networks 938, to the one or more computing device(s) 932 at a particular frequency, after a lapse of a predetermined period of time, in near real-time, etc.

The vehicle 902 may also include emitter(s) 908 for emitting light and/or sound, as described above. The emitter(s) 908 may include interior audio and visual emitter(s) to communicate with passengers of the vehicle 902. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 908 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 902 may also include network interface(s) 910 that enable communication between the vehicle 902 and one or more other local or remote computing device(s). The network interface(s) 910 may facilitate communication with other local computing device(s) on the vehicle 902 and/or the drive component(s) 912. The network interface(s) 910 may additionally or alternatively allow the vehicle to communicate with other nearby computing device(s) (e.g., other nearby vehicles, traffic signals, etc.). The network interface(s) 910 may additionally or alternatively enable the vehicle 902 to communicate with computing device(s) 932 over a network 938. In some examples, computing device(s)

932 may comprise one or more nodes of a distributed computing system (e.g., a cloud computing architecture).

The vehicle 902 may include one or more drive components 912. In some instances, the vehicle 902 may have a single drive component 912. In some instances, the drive component(s) 912 may include one or more sensors to detect conditions of the drive component(s) 912 and/or the surroundings of the vehicle 902. By way of example and not limitation, the sensor(s) of the drive component(s) 912 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 912. In some cases, the sensor(s) on the drive component(s) 912 may overlap or supplement corresponding systems of the vehicle 902 (e.g., sensor(s) 906).

The drive component(s) 912 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 912 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 912. Furthermore, the drive component(s) 912 may also include one or more communication connection(s) that enable communication by the respective drive component with one or more other local or remote computing device(s).

The vehicle computing device(s) 904 may include processor(s) 914 and memory 916 communicatively coupled with the one or more processors 914. Computing device(s) 932 may also include processor(s) 934, and/or memory 936. The processor(s) 914 and/or 934 may be any suitable processor capable of executing instructions to process data and perform operations as described herein. By way of example and not limitation, the processor(s) 914 and/or 934 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 916 and/or 936 may be examples of non-transitory computer-readable media. The memory 916 and/or 936 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 916 and/or memory 936 may store a perception component 918, localization component 920, planning component 922, map(s) 924, driving log data 926, prediction component 928, and/or system controller(s) 930—zero or more portions of any of which may be hardware, such as GPU(s), CPU(s), and/or other processing units.

The perception component 918 may detect object(s) in in an environment surrounding the vehicle 902 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 918 may be configured to associate a bounding region (or other indication) with an identified object. The perception component 918 may be configured to associate a confidence score associated with a classification of the identified object with an identified object. In some examples, objects, when rendered via a display, can be colored based on their perceived class. The object classifications determined by the perception component 918 may distinguish between different object types such as, for example, a traffic light, a passenger vehicle, a pedestrian, a bicyclist, motorist, a delivery truck, a semi-truck, traffic signage, and/or the like.

In at least one example, the localization component 920 may include hardware and/or software to receive data from the sensor(s) 906 to determine a position, velocity, and/or orientation of the vehicle 902 (e.g., one or more of an x-, y-, z-position, roll, pitch, or yaw). For example, the localization component 920 may include and/or request/receive map(s) 924 of an environment and can continuously determine a location, velocity, and/or orientation of the autonomous vehicle 902 within the map(s) 924. In some instances, the localization component 920 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 920 may provide data to various components of the vehicle 902 to determine an initial position of an autonomous vehicle for generating a trajectory and/or for generating map data, as discussed herein. In some examples, localization component 920 may provide, to the perception component 918, a location and/or orientation of the vehicle 902 relative to the environment and/or sensor data associated therewith.

The planning component 922 may receive a location and/or orientation of the vehicle 902 from the localization component 920 and/or perception data from the perception component 918 and may determine instructions for controlling operation of the vehicle 902 based at least in part on any of this data. The planning component 922 may correspond to the downstream ML model 150 described in relation to FIG. 1. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 930 and/or drive component(s) 912 may parse/cause to be carried out, second instructions for the emitter(s) 908 may be formatted according to a second format associated therewith).

The driving log data 926 (also referred to as log data) may comprise sensor data and perception data collected or determined by the vehicle 902 (e.g., by the perception component 918), as well as any other message generated and or sent by the vehicle 902 during operation including, but not limited to, control messages, error messages, etc. In some examples, the vehicle 902 may transmit the driving log data 926 to the computing device(s) 932. In some examples, the driving log data 926 may comprise (historical) perception data that was generated on the vehicle 902 during operation of the vehicle. As discussed herein, historical sensor data may be a valuable source of training data for a machine learning model, even if unlabeled. The data 926 may be used as training data for the SSL model 130 described in relation to FIGS. 1-9. The data 926 may comprise simulated driving data and/or real driving data relating to hundreds, thousands, or millions of different driving scenarios.

The prediction component 928 may generate one or more probability maps representing prediction probabilities of possible locations of one or more objects in an environment. For example, the prediction component 928 may generate one or more probability maps for vehicles, pedestrians, animals, and the like within a threshold distance from the vehicle 902. In some examples, the prediction component 928 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 922 may be communicatively coupled to the prediction component 928 to generate predicted trajectories of objects in an environment. For example, the prediction component 928 may generate one or more predicted trajectories for objects within a threshold distance from the vehicle 902. In some examples, the prediction component 928 may measure a trace of an object and generate a trajectory for the object based on observed and predicted behavior. Although prediction component 928 is shown on a vehicle 902 in this example, the prediction component 928 may also be provided elsewhere, such as in a remote computing device. In some examples, a prediction component may be provided at both a vehicle and a remote computing device. These components may be configured to operate according to the same or a similar algorithm.

The memory 916 and/or 936 may additionally or alternatively store a mapping system, a planning system, a ride management system, etc. Although perception component 918 and/or planning component 922 are illustrated as being stored in memory 916, perception component 918 and/or planning component 922 may include processor-executable instructions, machine-learned model(s) (e.g., a neural network), and/or hardware.

The memory 916 may store one or more prediction models 940 that may be used for trajectory determination or, as described herein, determining turning intention of person-wide vehicles.

As described herein, the localization component 920, the perception component 918, the planning component 922, the prediction component 928, the prediction model(s) 940 and/or other components of the system 900 may comprise one or more ML models and may correspond to the downstream ML model 150 (FIG. 1). For example, the localization component 920, the perception component 918, the planning component 922, the prediction component 928 and/or the prediction model(s) 940 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping. Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 920 may additionally or alternatively store one or more system controller(s) 930, which may be configured to control steering, propulsion, braking, safety, emitters, communication, and other systems of the vehicle 902. These system controller(s) 930 may communicate with and/or control corresponding systems of the drive component(s) 912 and/or other components of the vehicle 902.

It should be noted that while FIG. 9 is illustrated as a distributed system, in alternative examples, components of the vehicle 902 may be associated with the computing device(s) 932 and/or components of the computing device(s) 932 may be associated with the vehicle 902. That is, the vehicle 902 may perform one or more of the functions associated with the computing device(s) 932, and vice versa. The computing devices 932 may be configured to perform the method 500 of FIG. 4, the method 600 of FIG. 5 and the method 800 of FIG. 8 and the steps described in relation to the training phase of FIG. 1 and the adaptation and inference phases of FIG. 6.

While a number of the aforementioned examples describe sensor data involving visual and LiDAR images, it is understood that the present disclosure is not limited as such. The sensor data and training sensor data may be received from any number of suitable sensors. For example, any combination of visual, LiDAR, infrared, sonar, radar, amongst other sensor data may be used as input to a single network or machine learning component. Furthermore, sensor data from more than two different types of sensors may be combined. For example, sensor data from three or more different sensors may be projected into a common representation and combined to form a single input to a machine learning component.

Example Clauses

The description contains the following numbered clauses:

1. A system comprising: one or more processors; and one or more non-transitory computer-readable media storing instructions that, when executed, cause the system to perform operations comprising: receiving data associated with a vehicle operating within an environment; generating, based at least in part on the data, a graph comprising a plurality of nodes, a node of the plurality associated with one or more of a vehicle operating in the environment, a road feature, an additional vehicle, or a pedestrian; inputting the graph into a self-supervised machine learned model comprising an encoder, wherein the machine learned model is trained to output a representation associated with the node; and receiving, from the self-supervised machine learned model, a representation associated with the node; and transmitting the representation to a downstream machine learned model trained to output control data based at least in part on the representation, wherein the control data is configured to control the vehicle or another vehicle.

2. The system of any preceding clause, wherein the operations further comprise: masking a portion of training data corresponding to a node, thereby generating a masked portion of training data and an unmasked portion of training data; inputting the masked portion and the unmasked portion of training data to the self-supervised machine learned model; receiving a representation associated with the unmasked portion of training data and a proposed representation associated with the masked portion of training data; determining a loss based at least in part on the masked portion of training data and the proposed representation; and updating the self-supervised machine learned model based on the loss.

3. The system of any preceding clause, wherein the training data comprises a set of data over a series of time steps and masking the portion of training data comprises one of: temporal masking of a portion of the training data corresponding to the node associated with a time step of the series of time steps; random masking of a random portion of the training data corresponding to the node; or node masking of the training data corresponding to the node across the series of time steps.

4. The system of any preceding clause, wherein the operations further comprise: receiving an input defining a task, wherein the downstream machine learned model is configured to perform the task; and adapting the self-supervised machine learned model based on the task such that the representation is generated based at least in part on the task.

5. The system of any preceding clause, wherein the graph further comprises a plurality of edges, such that there is at least one edge between the node and another node of the plurality, whereby the at least one edge is representative of a relationship between the at least one vehicle operating in the environment, a road feature, an additional vehicle, or a pedestrian associated with the node and at least one other of a vehicle operating in the environment, a road feature, an additional vehicle, or a pedestrian associated with the another node.

6. A method comprising: receiving data associated with an environment; generating, based at least in part on the data, a graph representation of the environment comprising a plurality of nodes and a plurality of edges, a node of the plurality associated with a feature of the environment and an edge of the plurality connecting two nodes; inputting the graph into a machine learned model; receiving, from the machine learned model, a node representation associated with the node of the graph; and providing, to another machine learned model, the node representation for use in operating an autonomous vehicle in the environment in relation to or determining characteristics associated with the feature.

7. The method of any preceding clause, wherein the machine learned model comprises an encoder and one or more reconstruction layers and wherein the method further comprises: a training process comprising: masking a portion of the data corresponding to a node, thereby generating a masked portion of training data and an unmasked portion of training data; inputting the masked portion and the unmasked portion of training data to the machine learned model; receiving, from the machine learned model, a proposed node representation associated with the masked portion of training data; determining a loss based at least in part on the proposed node representation and the masked portion of training data; updating the machine learned model based on the loss; and deploying the machine learned model to a vehicle computing system such that the machine learned model is configured to output a node representation for use by the another machine learned model.

8. The method of any preceding clause, wherein the data comprises a set of data over a series of time steps and masking a portion of the set of training log data comprises at least one of: temporal masking of the data corresponding to the node at a time step of the series of time steps; random masking of a random portion of the data corresponding to the node; or node masking of the data corresponding to the node across the series of time steps.

9. The method of any preceding clause, wherein the graph further comprises a plurality of edges, such that there is at least one edge between the node and another node of the plurality, whereby the at least one edge is representative of a relationship between the feature associated with the node and at least one other feature of the environment associated with the another node.

10. The method of any preceding clause, wherein the another machine learning model is an on-vehicle machine learning model executed on the autonomous vehicle and configured to control the autonomous vehicle based at least in part on the node representation.

11. The method of any preceding clause, further comprising: receiving an input defining a task, wherein the another machine learned model is configured to perform the task; and adapting the machine learned model based on the task, such that the node representation is generated based at least in part on the task.

12. The method of any preceding clause, wherein the feature of the environment comprises one or more of: a vehicle; a pedestrian; and a road feature, wherein a road feature comprises at least one of: a speed limit; curvature of the road; a gradient of the road; and a junction or intersection with another road.

13. One or more non-transitory computer-readable media storing instructions executable by one or more processors, wherein the instructions, when executed, cause the one or more processors to perform operations comprising receiving data associated with an environment; generating, based at least in part on the data, a graph representation of the environment comprising a plurality of nodes and a plurality of edges, a node of the plurality associated with a feature of the environment and an edge of the plurality connecting two nodes; inputting the graph into a machine learned model; receiving, from the machine learned model, a node representation associated with the node of the graph; and providing, to another machine learned model, the node representation for use in operating an autonomous vehicle in the environment in relation to or determining characteristics associated with the feature.

14. The one or more non-transitory computer-readable media of any preceding clause, wherein the operations further comprise: a training process comprising: masking a portion of the data corresponding to a node, thereby generating a masked portion of training data and an unmasked portion of training data; inputting the masked portion and the unmasked portion of training data to the machine learned model; receiving a proposed node representation associated with the masked portion of training data; determining a loss based at least in part on the proposed node representation and the masked portion of training data; updating the machine learned model based on the loss; and deploying the machine learned model to a vehicle computing system such that the machine learned model is configured to output a node representation for use by the another machine learned model.

15. The one or more non-transitory computer-readable media of any preceding clause, wherein the data comprises a set of data over a series of time steps and masking a portion of the set of training log data comprises at least one of: temporal masking of the data corresponding to the node at a time step of the series of time steps; random masking of a random portion of the data corresponding to the node; or node masking of the data corresponding to the node across the series of time steps.

16. The one or more non-transitory computer-readable media of any preceding clause, wherein the graph further comprises a plurality of edges, such that there is at least one edge between the node and another node of the plurality, whereby the at least one edge is representative of a relationship between the feature associated with the node and at least one other feature of the environment associated with the another node.

17. The one or more non-transitory computer-readable media of any preceding clause, wherein the another machine learning model is an on-vehicle machine learning model executed on the autonomous vehicle and configured to control the autonomous vehicle based at least in part on the node representation.

18. The one or more non-transitory computer-readable media of any preceding clause, wherein the operations further comprise: receiving an input defining a task, wherein the another machine learned model is configured to perform the task; and adapting the machine learned model based on the task, such that the node representation is generated based at least in part on the task.

19. The one or more non-transitory computer-readable media of any preceding clause, wherein the feature of the environment comprises one or more of: a vehicle; a pedestrian; and a road feature, wherein a road feature comprises at least one of: a speed limit; curvature of the road; a gradient of the road; and a junction or intersection with another road.

20. A system comprising: one or more processors; and one or more non-transitory computer-readable media storing instructions that, when executed, cause the system to perform operations comprising: receiving a pretrained model configured to output a plurality of representations based at least in part on an input comprising a graph representing an environment through which a vehicle is traversing, a node of the graph comprising, as an embedding, a vector encoding; receiving a task comprising: a function to append to the pretrained model, a dataset, a loss function; and updating, based at least in part on the task, the pretrained model to generate an updated machine learned model; and deploying the updated machine learned model to a vehicle computing system associated with a vehicle configured to be controlled based at least in part on an output of the updated machine learned model.

21. The system of any preceding clause, wherein the pretrained machine learned model comprises a layer comprising a plurality of parameters, and wherein updating the pretrained machine learned model comprises at least one of: updating a subset of the parameters of the layer; appending the function to the pretrained machine learned model, wherein the function comprises a further set of parameters defined in relation to the task and is configured to receive the plurality of representations output by the pretrained machine learned model and generate an output based at least in part on the same; or downscaling the pretrained machine learned model by removing one or more of the plurality of parameters.

22. The system of any preceding clause, wherein: the task is a first task, the operations further comprise receiving a second task, and updating the pretrained model based at least in part on the second task to generate a second updated machine learned model; and deploying the second updated machine learned model to the vehicle computing system associated with a vehicle configured to be controlled based at least in part on an output of the second updated machine learned model.

23. The system of any preceding clause, wherein the pretrained model comprises a self-supervised model that is trained based at least in part on passing an output of the pretrained model through a training decoder to reconstruct the environment.

24. The system of any preceding clause, wherein the first task comprises at least one of the following: detecting one or more additional vehicles or pedestrians within the environment; detecting one or more static objects within the environment; predicting a trajectory for an additional vehicle or pedestrian within the environment; predicting an attribute associated with the additional vehicle or pedestrian; clustering a driving scenario; predicting a likelihood of a collision associated with a dynamic object within the environment; and determining a relevancy score for an object within the environment.

25. The system of any preceding clause, wherein the node comprises one or more of: a road feature of the environment, a pedestrian, a static object, a dynamic object, or a road policy.

26. A method comprising: updating a machine learned model, pretrained to generate an output associated with a feature of an environment, based at least in part on at least one characteristic of a first task associated with a vehicle operating in the environment, thereby generating an updated machine learned model, wherein the machine learned model is adaptable for multiple different tasks; inputting data associated with the first task to the updated machine learned model; receiving, an output of the updated machine learned model associated with a feature of the environment, wherein the output is generated based at least in part on the first task; and at least one of: controlling the vehicle based at least in part on the output; or deploying the updated machine learned model to a vehicle computing system associated with the vehicle.

27. The method of clause 26, wherein the vehicle computing system is configured to input the output to a task function appended to the machine learned model, wherein the task function is trained to perform the first task; receive a task output from the task function; and generate control data for controlling the vehicle within the environment, based at least in part on the task output.

28. The method of any preceding clause, wherein the first machine learned model comprises at least one layer comprising a plurality of parameters and updating the first machine learned model comprises at least one of the following: updating a subset or all of the parameters of the at least one layer; appending a function to the machine learned model, wherein the function comprises a further set of parameters defined in relation to the first task and is configured to receive the output from the machine learned model and generate a task output based at least in part on the same; or downscaling the machine learned model by removing at least one of the plurality of parameters.

29. The method of any preceding clause, further comprising: updating the machine learned model, based at least in part on a second task to generate a second updated machine learned model; inputting data associated with the second task to the second updated machine learned model; receiving, an output from the second updated machine learned model; and at least one of: transmitting the output to a vehicle computing system associated with the vehicle; or deploying the second updated machine learned model to the vehicle computing system associated with a vehicle configured to be controlled based at least in part on an output of the second updated machine learned model.

30. The method of any preceding clause, further comprising: determining, based at least in part on the output, a performance metric for the updated machine learned model; and determining that the performance metric satisfies a performance threshold associated with the updated machine learned model.

31. The method of any preceding clause, further comprising: receiving a notification comprising data related to the first task, wherein the machine learned model is updated based at least in part on the data and wherein the data comprises: a function to append to the machine learned model; a dataset; a loss function; and a metric function.

32. The method of any preceding clause, wherein the first task comprises at least one of the following: detecting one or more additional vehicles or pedestrians within the environment; detecting one or more static objects within the environment; predicting a trajectory for an additional vehicle or pedestrian within the environment; predicting an attribute associated with the additional vehicle or pedestrian; clustering a driving scenario; predicting a likelihood of a collision associated with a dynamic objection within the environment; and determining a relevancy score for an object within the environment.

33. One or more non-transitory computer-readable media storing instructions executable by one or more processors, wherein the instructions, when executed, cause the one or more processors to perform operations comprising: updating a machine learned model, pretrained to generate an output associated with a feature of an environment, based at least in part on at least one characteristic of a first task associated with a vehicle operating in the environment, thereby generating an updated machine learned model, wherein the machine learned model is adaptable for multiple different tasks; inputting data associated with the first task to the updated machine learned model; receiving, an output of the updated machine learned model associated with a feature of the environment, wherein the output is generated based at least in part on the first task; and at least one of: controlling the vehicle based at least in part on the output; or deploying the updated machine learned model to a vehicle computing system associated with the vehicle.

34. The one or more non-transitory computer-readable media of clause 33, wherein the vehicle computing system is configured to input the output to a task function appended to the machine learned model, wherein the task function is trained to perform the first task; receive a task output from the task function; and generate control data for controlling the vehicle within the environment, based at least in part on the task output.

35. The one or more non-transitory computer-readable media of any preceding clause, wherein the first machine learned model comprises at least one layer comprising a plurality of parameters and updating the first machine learned model comprises at least one of the following: updating a subset or all of the parameters of the at least one layer; appending a function to the machine learned model, wherein the function comprises a further set of parameters defined in relation to the first task and is configured to receive the output from the machine learned model and generate a task output based at least in part on the same; or downscaling the machine learned model by removing at least one of the plurality of parameters.

36. The one or more non-transitory computer-readable media of any preceding clause, wherein the operations further comprise: updating the machine learned model, based at least in part on a second task to generate a second updated machine learned model; inputting data associated with the second task to the second updated machine learned model; receiving, an output from the second updated machine learned model; and at least one of: transmitting the output to a vehicle computing system associated with the vehicle; or deploying the second updated machine learned model to the vehicle computing system associated with a vehicle configured to be controlled based at least in part on an output of the second updated machine learned model.

37. The one or more non-transitory computer-readable media of any preceding clause, wherein the operations further comprise: determining, based at least in part on the output, a performance metric for the updated machine learned model; and determining that the performance metric satisfies a performance threshold associated with the updated machine learned model.

38. The one or more non-transitory computer-readable media of any preceding clause, wherein the operations further comprise: receiving a notification comprising data related to the first task, wherein the machine learned model is updated based at least in part on the data and wherein the data comprises: a function to append to the machine learned model; a dataset; a loss function; and a metric function.

39. The one or more non-transitory computer-readable media of any preceding clause, wherein the operations further comprise: detecting one or more additional vehicles or pedestrians within the environment; detecting one or more static objects within the environment; predicting a trajectory for an additional vehicle or pedestrian within the environment; predicting an attribute associated with the additional vehicle or pedestrian; clustering a driving scenario; predicting a likelihood of a collision associated with a dynamic objection within the environment; and determining a relevancy score for an object within the environment.

While the example clauses described above are described with respect to one particular implementation, it should be understood that, in the context of this document, the content of the example clauses can also be implemented via a method, device, system, computer-readable medium, and/or another implementation. Additionally, any of examples of clauses 1-39 may be implemented alone or in combination with any other one or more of the examples of clauses 1-39.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, “may,” “could,” “may” or “might,” unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase “at least one of X, Y or Z,” unless specifically stated otherwise, is to be understood to present that an item, term, etc. may be either X, Y, or Z, or any combination thereof, including multiples of each element. Unless explicitly described as singular, “a” means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing instructions that, when executed, cause the system to perform operations comprising:
receiving data associated with a vehicle operating within an environment;
generating, based at least in part on the data, a graph comprising a plurality of nodes, a node of the plurality of nodes associated with one or more of the vehicle operating in the environment, a road feature, an additional vehicle, or a pedestrian;
inputting the graph into a self-supervised machine learned model comprising an encoder, wherein the machine learned model is trained to output a representation associated with the node;
receiving, from the self-supervised machine learned model, a representation associated with the node; and
transmitting the representation to a downstream machine learned model trained to output control data based at least in part on the representation, wherein the control data is configured to control the vehicle or another vehicle.

2. The system of claim 1, wherein the operations further comprise:
masking a portion of training data corresponding to a node of the plurality of nodes, thereby generating a masked portion of training data and an unmasked portion of training data;
inputting the masked portion and the unmasked portion of training data to the self-supervised machine learned model;
receiving a representation associated with the unmasked portion of training data and a proposed representation associated with the masked portion of training data;
determining a loss based at least in part on the masked portion of training data and the proposed representation; and
updating the self-supervised machine learned model based on the loss.

3. The system of claim 2, wherein the training data comprises a set of data over a series of time steps and masking the portion of training data comprises one of:
temporal masking of a portion of the training data corresponding to the node associated with a time step of the series of time steps;
random masking of a random portion of the training data corresponding to the node; or
node masking of the training data corresponding to the node across the series of time steps.

4. The system of claim 1, wherein the operations further comprise:
receiving an input defining a task, wherein the downstream machine learned model is configured to perform the task; and
adapting the self-supervised machine learned model based on the task such that the representation is generated based at least in part on the task.

5. The system of claim 1, wherein the graph further comprises a plurality of edges, such that there is at least one edge between the node and another node of the plurality of nodes, whereby the at least one edge is representative of a relationship between the at least one of the vehicle operating in the environment, road feature, additional vehicle, or pedestrian associated with the node and at least one other of a vehicle operating in the environment, a road feature, an additional vehicle, or a pedestrian associated with the another node.

6. A method comprising:
receiving data associated with an environment;
generating, based at least in part on the data, a graph representation of the environment comprising a plurality of nodes and a plurality of edges, a node of the plurality of nodes associated with a feature of the environment and an edge of the plurality of edges connecting two nodes;
inputting the graph into a machine learned model;
receiving, from the machine learned model, a node representation associated with the node of the graph; and
providing, to another machine learned model, the node representation for use in operating an autonomous vehicle in the environment in relation to or determining characteristics associated with the feature.

7. The method of claim 6, wherein the machine learned model comprises an encoder and one or more reconstruction layers and wherein the method further comprises:
a training process comprising:
masking a portion of the data corresponding to a node of the plurality of nodes, thereby generating a masked portion of training data and an unmasked portion of training data;
inputting the masked portion and the unmasked portion of training data to the machine learned model;
receiving, from the machine learned model, a proposed node representation associated with the masked portion of training data;
determining a loss based at least in part on the proposed node representation and the masked portion of training data;
updating the machine learned model based on the loss; and
deploying the machine learned model to a vehicle computing system such that the machine learned model is configured to output the node representation for use by the another machine learned model.

8. The method of claim 7, wherein the data comprises a set of data over a series of time steps and masking a portion of the set of data comprises at least one of:
temporal masking of the data corresponding to the node at a time step of the series of time steps;
random masking of a random portion of the data corresponding to the node; or
node masking of the data corresponding to the node across the series of time steps.

9. The method of claim 6, wherein the graph further comprises a plurality of edges, such that there is at least one edge between the node and another node of the plurality of nodes, whereby the at least one edge is representative of a relationship between the feature associated with the node and at least one other feature of the environment associated with the another node.

10. The method of claim 6, wherein the another machine learned model is an on-vehicle machine learning model executed on the autonomous vehicle and configured to control the autonomous vehicle based at least in part on the node representation.

11. The method of claim 6, further comprising:
receiving an input defining a task, wherein the another machine learned model is configured to perform the task; and
adapting the machine learned model based on the task, such that the node representation is generated based at least in part on the task.

12. The method of claim 6, wherein the feature of the environment comprises one or more of:
a vehicle;
a pedestrian; and
a road feature, wherein the road feature comprises at least one of:
a speed limit;
curvature of the road;
a gradient of the road; and
a junction or intersection with another road.

13. One or more non-transitory computer-readable media storing instructions executable by one or more processors, wherein the instructions, when executed, cause the one or more processors to perform operations comprising:
receiving data associated with an environment;
generating, based at least in part on the data, a graph representation of the environment comprising a plurality of nodes and a plurality of edges, a node of the plurality of nodes associated with a feature of the environment and an edge of the plurality of edges connecting two nodes;
inputting the graph into a machine learned model;
receiving, from the machine learned model, a node representation associated with the node of the graph; and
providing, to another machine learned model, the node representation for use in operating an autonomous vehicle in the environment in relation to or determining characteristics associated with the feature.

14. The one or more non-transitory computer-readable media of claim 13, wherein the operations further comprise:
a training process comprising:
masking a portion of the data corresponding to a node of the plurality of nodes, thereby generating a masked portion of training data and an unmasked portion of training data;
inputting the masked portion and the unmasked portion of training data to the machine learned model;
receiving a proposed node representation associated with the masked portion of training data;
determining a loss based at least in part on the proposed node representation and the masked portion of training data;
updating the machine learned model based on the loss; and
deploying the machine learned model to a vehicle computing system such that the machine learned model is configured to output the node representation for use by the another machine learned model.

15. The one or more non-transitory computer-readable media of claim 14, wherein the data comprises a set of data over a series of time steps and masking a portion of the set of data comprises at least one of:
temporal masking of the data corresponding to the node at a time step of the series of time steps;
random masking of a random portion of the data corresponding to the node; or
node masking of the data corresponding to the node across the series of time steps.

16. The one or more non-transitory computer-readable media of claim 13, wherein the graph further comprises a plurality of edges, such that there is at least one edge between the node and another node of the plurality of nodes, whereby the at least one edge is representative of a relationship between the feature associated with the node and at least one other feature of the environment associated with the another node.

17. The one or more non-transitory computer-readable media of claim 13, wherein the another machine learned model is an on-vehicle machine learning model executed on the autonomous vehicle and configured to control the autonomous vehicle based at least in part on the node representation.

18. The one or more non-transitory computer-readable media of claim 13, wherein the operations further comprise:
receiving an input defining a task, wherein the another machine learned model is configured to perform the task; and
adapting the machine learned model based on the task, such that the node representation is generated based at least in part on the task.

19. The one or more non-transitory computer-readable media of claim 13, wherein the feature of the environment comprises one or more of:
a vehicle;
a pedestrian; and
a road feature, wherein the road feature comprises at least one of:
a speed limit;
curvature of the road;
a gradient of the road; and
a junction or intersection with another road.

* * * * *